(12) United States Patent
Roggenkamp et al.

(10) Patent No.: US 10,766,494 B2
(45) Date of Patent: Sep. 8, 2020

(54) ROAD SURFACE CHARACTERIZATION BASED UPON FILTER COEFFICIENTS

(71) Applicant: GM Global Technology Operations LLC, Detroit, MI (US)

(72) Inventors: Timothy J. Roggenkamp, Brighton, MI (US); Christopher A. Stirlen, Milford, MI (US); Frank C. Valeri, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 15/932,267

(22) Filed: Feb. 16, 2018

(65) Prior Publication Data
US 2019/0256101 A1    Aug. 22, 2019

(51) Int. Cl.
| | |
|---|---|
| *B60W 40/00* | (2006.01) |
| *B60W 40/06* | (2012.01) |
| *B60W 10/04* | (2006.01) |
| *B60W 40/105* | (2012.01) |
| *B60W 40/10* | (2012.01) |

(52) U.S. Cl.
CPC ............ *B60W 40/06* (2013.01); *B60W 40/10* (2013.01); *B60W 40/105* (2013.01); *B60W 10/04* (2013.01); *B60W 2400/00* (2013.01); *B60W 2420/54* (2013.01); *B60W 2552/35* (2020.02); *B60W 2710/10* (2013.01); *B60W 2710/18* (2013.01); *B60W 2710/20* (2013.01); *B60W 2710/30* (2013.01); *B60W 2720/10* (2013.01); *B60W 2900/00* (2013.01)

(58) Field of Classification Search
CPC .... B60W 40/00; B60W 40/06; B60W 40/068; B60W 40/10; B60W 40/105; B60W 10/00; B60W 10/04; G10K 15/00; G10K 11/00; G10K 11/36; G10K 2210/128; G10K 2210/1281; G10K 2210/1282; G10K 2210/3033; B60T 8/1701; B60T 8/172; B60T 8/173; B60T 8/32
See application file for complete search history.

(56) References Cited

U.S. PATENT DOCUMENTS

| | | | | |
|---|---|---|---|---|
| 5,758,311 | A * | 5/1998 | Tsuji | G10K 11/178 |
| | | | | 701/111 |
| 9,139,056 | B2 * | 9/2015 | Breuer | B60C 23/02 |
| 2015/0269840 | A1 * | 9/2015 | Hirata | G08G 1/0129 |
| | | | | 701/118 |
| 2017/0176196 | A1 * | 6/2017 | Powers | B60W 40/06 |
| 2018/0276832 | A1 * | 9/2018 | Aikin | G06T 7/40 |
| 2019/0088247 | A1 * | 3/2019 | True | G10K 11/178 |

FOREIGN PATENT DOCUMENTS

| | | |
|---|---|---|
| WO | WO-2008113384 A1 | 9/2008 |
| WO | WO-2011054363 A1 | 5/2011 |

\* cited by examiner

*Primary Examiner* — Yonel Beaulieu

(57) ABSTRACT

A system that determines a road surface profile based upon filter coefficient data from noise cancellation systems is disclosed. The system includes a filter coefficient monitoring module that is configured to receive a first set of filter coefficient data from an noise cancellation module. The system also includes a road surface profile module that is configured to receive an input representing a road surface type and generate a road surface profile based upon the road surface type and the first set of filter coefficient data and to store the road surface profile including a correspondence between the road surface type and the first set of filter coefficient data.

13 Claims, 4 Drawing Sheets

ROAD SURFACE CHARACTERIZATION BASED UPON FILTER COEFFICIENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

During operation, drivers and passengers experience noises that may be undesirable. Some vehicles employ active noise cancellation techniques that generate filter coefficients that are used to cancel these undesirable noises within a vehicle cabin.

SUMMARY

The present disclosure relates to determining road surface profiles, and more particularly to a system and method for generating a road surface profile and determining a road surface type based upon filter coefficients.

In an example, a system that determines a road surface profile based upon filter coefficient data from noise cancellation systems is disclosed. The system includes a filter coefficient monitoring module that is configured to receive a first set of filter coefficient data from an noise cancellation module and a road surface profile module that is configured to receive an input representing a road surface type and generate a road surface profile based upon the road surface type and the first set of filter coefficient data.

In other features, the system includes a road surface determination module that is configured to receive a second set of filter coefficient data and determine the road surface type based upon the second set of filter coefficient data, and the road surface determination module is further configured to access a look-up table, provide the second set of filter coefficient data to the look-up table, and receive the road surface type from the look-up table.

In other features, the system includes the look-up table, and the road surface profile module is further configured to store the road surface profile in the look-up table.

In other features, the road surface determination module is further configured to provide the road surface type to a vehicle communication bus.

In other features, the vehicle communication bus provides the road surface type to a control module that is configured to modify an operating parameter of a vehicle based upon the road surface type.

In other features, the operating parameter comprises applying a brake, adjusting a body mount, or adjusting an active filter associated with the noise cancellation module.

In other features, the road surface profile module is further configured to calculate an average of the first set of filter coefficient data to represent the road surface profile.

In other features, the road surface profile module is further configured to perform a matrix calculation on the first set of filter coefficient data to represent the road surface profile.

In other features, the noise cancellation module comprises a filter and the first set of filter coefficient data and the second set of filter coefficient data are generated by the filter.

In other features, wherein the road surface profile module is further configured to receive user input representing at least one of a road surface type or a selectable vehicle operating mode.

In another example, a method that determines a road surface profile based upon filter coefficient data from noise cancellation systems is disclosed. The method includes receiving a second set of filter coefficient data and retrieving a road surface profile based upon the second set of filter coefficient data, the road surface profile including a road surface type that corresponds to a first set of filter coefficient data. The method also includes determining the road surface type based upon the second set of filter coefficient data.

In other features, the method includes accessing a look-up table, providing the second set of filter coefficient data to the look-up table, and receiving the road surface type from the look-up table.

In other features, the method includes storing the road surface profile in the look-up table.

In other features, the first set of filter coefficient data and the second set of filter coefficient data are generated by a filter of the noise cancellation module.

In other features, the method includes providing the road surface type to a vehicle communication bus.

In other features, the method includes modifying an operating parameter of a vehicle based upon the road surface type.

In other features, the modification of operating parameter comprises at least one of applying a brake, adjusting a body mount, or adjusting an active filter associated with the noise cancellation module.

In other features, the method includes calculating an average of the first set of filter coefficient data to represent the road surface profile.

In other features, the method includes performing a matrix calculation on the first set of filter coefficient data to represent the road surface profile.

In other features, the method includes generating the road surface profile using a machine learning process based upon the first set of filter coefficient data.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is directed to generating a road surface profile (e.g., road surface characterization) using filter coefficients generated by noise cancellation systems and determining a road surface type based upon the filter coefficients. Active noise cancellation systems reduce undesirable noise perceptible by occupants within a vehicle. Active noise cancellation systems use digital signal processing and digital filtering techniques to generate interference signals that cancel the undesirable noise. For example, these active noise cancellation systems use adaptive filters to generate filter coefficients representative of the noise to be canceled. These generated filter coefficients can also be representative of the type of road surface being traversed by the vehicle.

Figure 1:
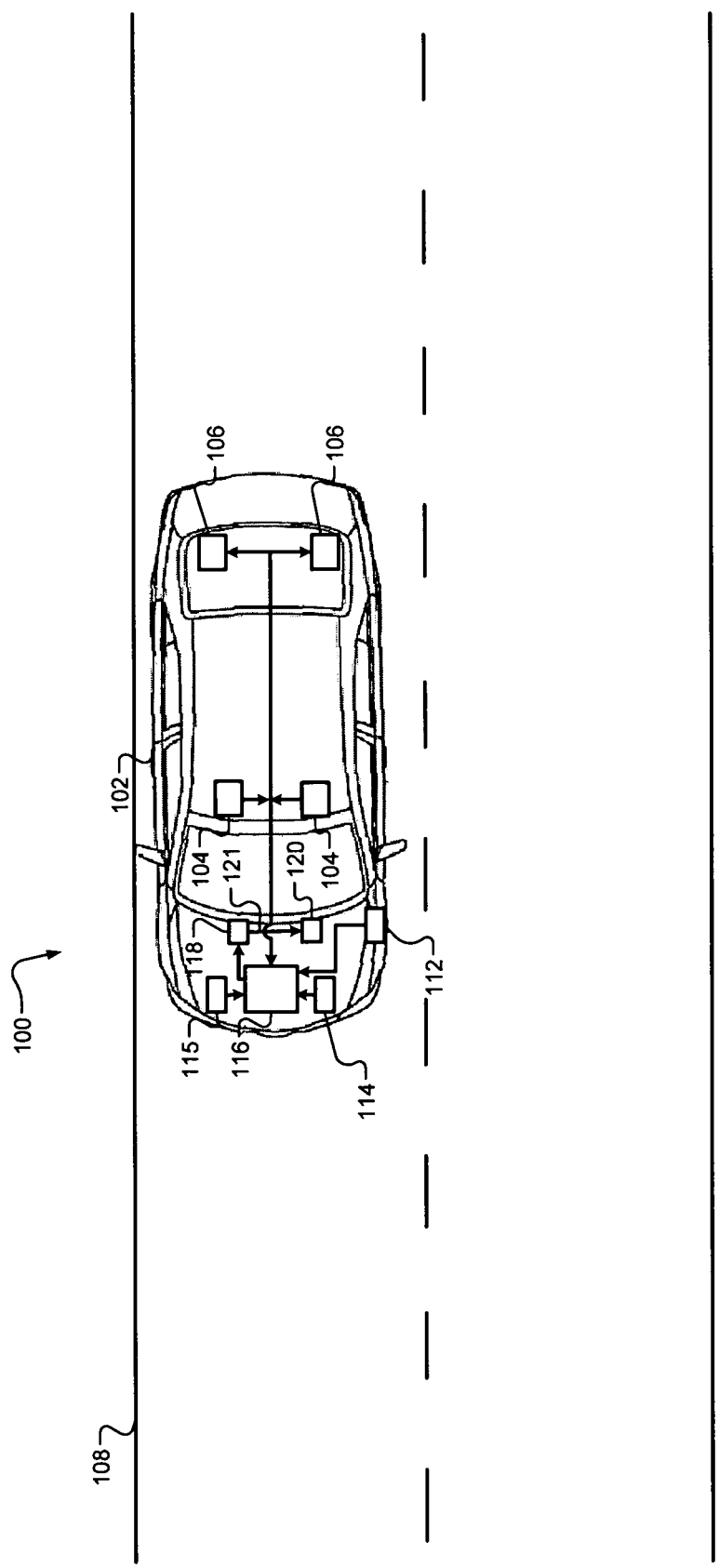
FIG. 1 is diagrammatic illustration of a vehicle including a road surface determination system in accordance with an example implementation of the present disclosure.

FIG. 1 illustrates a system 100 in accordance with an example implementation of the present disclosure. The system 100 includes a vehicle 102. As shown, the vehicle 102 includes one or more microphones 104 and one or more speakers 106. The microphones 104 detect sound within the cabin of the vehicle 102. The speakers 106 generate sounds within the vehicle 102 and/or outside of the vehicle 102. In one example, the speakers 106 emit sound waves having approximately the same amplitude but with an inverted phase (i.e., antiphase) to at least partially cancel the noise detected by the microphones 104. The microphones 104 can be deployed throughout the vehicle 102 to capture sound that occupants can hear. The speakers 106 may be deployed throughout the interior, such as in the doors, the rear shelf, and/or the roof, of the vehicle 102 to cancel noise detected by the microphones 104.

For example, microphones 104 detect noise during travel. In one example, the microphones 104 detect undesired noise produced while the vehicle 102 is traveling along the roadway 108. The speakers 106 generate audio that reduces the perceptibility of the undesired sound to the drivers and/or passengers of the vehicle 102.

The vehicle 102 includes one or more sensors that measure vehicle data. For example, the vehicle 102 can include wheel speed sensors 112 mounted to one or more wheels of the vehicle 102 that measure the speed of the wheels and/or the acceleration of the vehicle 102. The vehicle 102 can also include vibrational sensors 114 that measure one or more vibrations corresponding to the vehicle 102. For example, the vibrational sensor 114 can measure vibrations experienced by the vehicle 102 when the vehicle 102 travels over a roadway 108, mechanical vibrations associated with an engine of the vehicle 102, or the like. It is understood that the vehicle 102 may include additional or fewer sensors.

As shown, the vehicle 102 includes a noise cancellation module 116. The noise cancellation module 116 comprises an active noise cancellation system that generates signals having approximately the same amplitude as the detected noise but having an inverted phase with respect to the detected noise signals. The microphones 104, the wheel speed sensors 112, and/or the vibrational sensors 114 provide input data to the noise cancellation module 116 representative of the detected noise.

The microphones 104 detect noise and provide data representing the noise to the noise cancellation module 116. The noise cancellation module 116 processes the data and generates a signal that is emitted by the speakers 106 to effectively cancels, through destructive interference, the noise perceptible within the vehicle 102. For example, the noise cancellation module 116 includes adaptive filters that generate driving signals that are supplied to the speakers 106 to cancel noise perceptible within the vehicle 102. In an implementation, the adaptive filter may include a digital filter, such as a finite impulse response (FIR) filter, an infinite impulse response (IIR) filter, or the like.

The noise cancellation module 116 uses the adaptive filter to generate one or more filter coefficients based upon the received input. For example, the microphones 104, the wheel speed sensors 112, and/or the vibrational sensors 114 detect road noise generated by the vehicle 102 traveling over the roadway 108, and the noise cancellation module 116 uses the adaptive filter to generate filter coefficients based upon the detected road noise. The noise cancellation module 116 uses the filter coefficients to generate the driving signals that cancel the road noise within the vehicle 102.

As shown in FIG. 1, the vehicle 102 also includes a road surface determination module 118 that is in communication with the noise cancellation module 116. The road surface determination module 118 receives the filter coefficients and determines a type of road surface based upon the received filter coefficients. The road surface determination module 118 provides data indicative of the determined road surface to one or more components within the vehicle 102. For example, the road surface determination module 118 can provide the data to one or more control modules 120 and/or a communication bus 121 of the vehicle 102. While only a single control module 120, it is understood that the vehicle 102 can include multiple control modules 120. For example, the control modules 120 may include an engine control module, a chassis control module, a vehicle body control module, or the like.

The control module 120 is in communication with a propulsion system, a transmission system, a steering system, a brake system, and/or an actuator system of the vehicle 102. The control module 120 generates control signals in response to receiving the data indicative of the road surface and provides the control signals to the propulsion system, the transmission system, the steering system, the brake system, and/or the actuator system to control one or more operational parameters of the respective system.

For example, the control module 120 can generate a control signal to apply an anti-lock braking systems of the vehicle 102 based upon the determined road surface, adjust active body mounts of the vehicle 102 based upon the determined road surface type, adjust the active filter of the noise cancellation module 116 based upon the determined road surface type, and/or adjust damper rates of the vehicle 102 based upon the determined road surface type.

Figure 2:
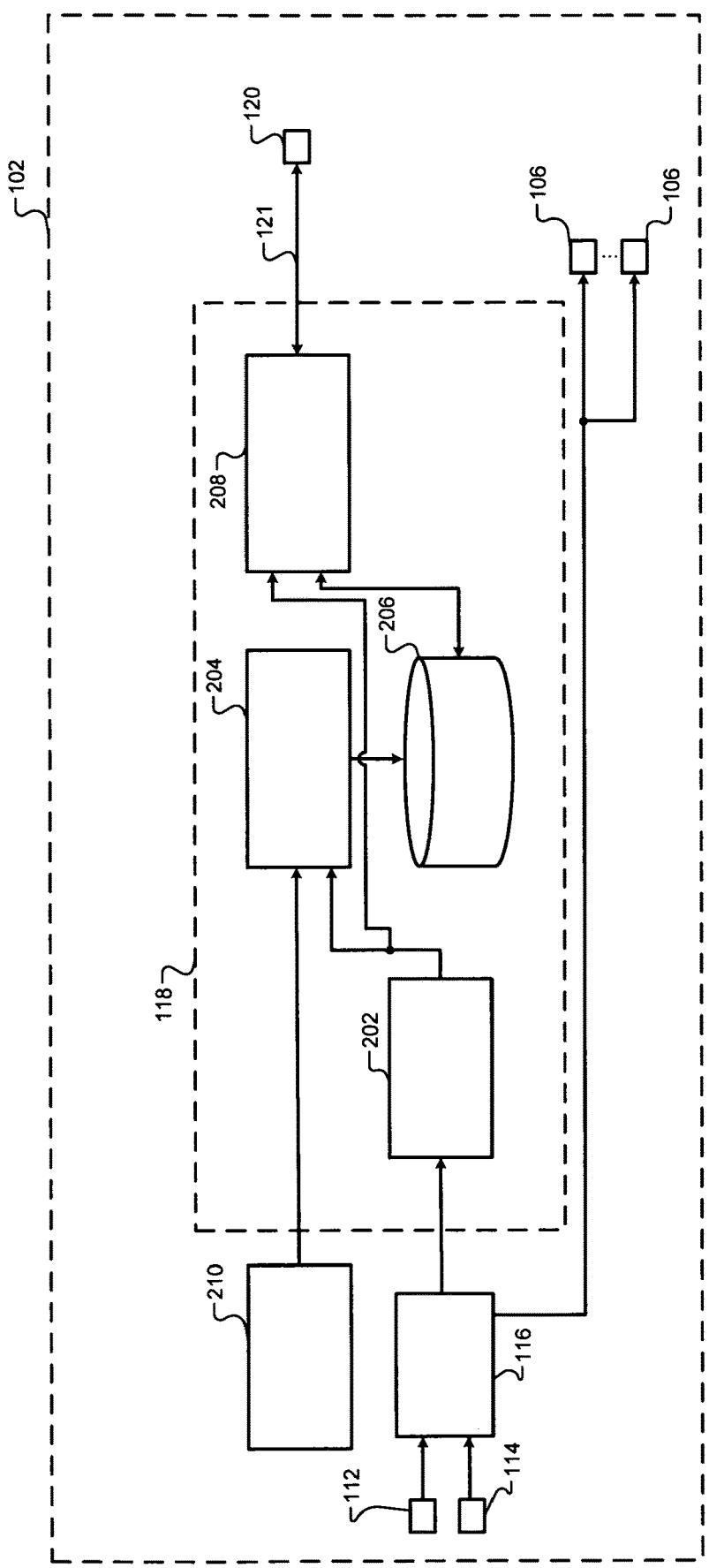
FIG. 2 is block diagram illustrating the road surface determination system in accordance with an example implementation of the present disclosure.

FIG. 2 illustrates an example implementation of the road surface determination module 118. As shown in FIG. 2, the road surface determination module 118 includes a filter coefficient monitoring module 202, a road surface profile module 204, a look-up table 206, and a road surface determination module 208.

The filter coefficient monitoring module 202 receives input from the noise cancellation module 116. For example, the filter coefficient monitoring module 202 receives the filter coefficients generated by the noise cancellation module 116 over a defined time period.

The road surface profile module 204 receives data from the filter coefficient monitoring module 202 and from a data input interface 210. In an implementation, the road surface profile module 204 receives the filter coefficients and input data from the data input interface 210. The input data from the data input interface 210 represents the road surface type being traversed by the vehicle 102. The input data may also comprise selectable vehicle operating modes, or drive modes, of the vehicle 102. It is understood that the data input interface 210 may comprise a variety of input devices. For example, the data input interface 210 may be a touch panel within the vehicle 102, a mobile electronic device that communicates with the vehicle 102, or the like. The road surface profile module 204 can also receive time period, or time interval, signals indicating when to start a time counter and end a time counter.

Based upon the input, the road surface profile module 204 generates a road surface profile. In an implementation, the road surface profile module 204 generates the road surface profile based upon the road surface type. In another implementation, the road surface profile module 204 generates the road surface profile based upon the road surface type and the selectable vehicle operating mode of the vehicle 102. The road surface profile module 204 stores the road surface profile in the look-up table 206. In one or more implementations, the road surface profile comprises the road surface type and the corresponding filter coefficients. The road surface type may include, but is not limited to, smooth, coarse, and the like.

The road surface profile module 204 can generate the road surface profile in a variety of ways. In an implementation, the road surface profile module 204 uses averaging calculation techniques to determine the filter coefficients that correspond to the road surface type. For example, the road surface profile module 204 receives a set of filter coefficients over a defined time period. The time period corresponds to a defined time period the vehicle 102 traveled over the road surface. The road surface profile module 204 calculates an average using the set of filter coefficients or a subset of filter coefficients for the time period. The road surface profile module 204 then associates the average with the road surface type input through the data input interface 210.

In another implementation, the road surface profile module 204 uses matrix manipulation techniques to determine the filter coefficients that correspond to the road surface type. For example, the road surface profile module 204 receives a set of filter coefficients over the defined time period. The road surface profile module 204 organizes the filter coefficients into a matrix and performs matrix decomposition on the matrix to create a resultant matrix. Using the resultant matrix, the road surface profile module 204 identifies relationships between singular values within the resultant matrix and the corresponding road surface type. The road surface profile module 204 associates the resultant matrix values with the road surface type.

In yet another implementation, the road surface profile module 204 can use suitable machine learning tools to generate the road surface profile. The machine learning tools may include Kalman filters, or the like. The machine learning tools can receive as input the coefficient filters, the averaged coefficient filters, the singular values from the resultant matrix, or the like.

The road surface determination module 208 receives, as input, the filter coefficients from the filter coefficient monitoring module 202. The road surface determination module 208 determines the road surface type based upon the received filter coefficients. In an implementation, the road surface determination module 208 accesses the look-up table 206 and provides the received filter coefficients to the look-up table 206. In response, the look-up table 206 provides the road surface type corresponding to the filter coefficients.

It is understood that the road surface determination module 208 can perform calculations, such as the average calculation, the matrix calculation, or the like, on the received filter coefficient data. The road surface determination module 208 can then provide the calculated data to the look-up table 206 and receives the road surface type based upon the calculated data. The road surface determination module 208 provides the road surface type to the control module 120. The control module 120 can generate the control signal to modify an operating parameter of the vehicle 102.

In some implementations, the road surface determination module 208 also receives, as input, control data from the control module 120. The control data may be vehicle data, such as acceleration data, vibration data, or the like. In these implementations, the look-up table 206 may also store corresponding control data for the road surface type. For instance, a smooth road surface and an icy road surface may have similar filter coefficients. The road surface determination module 208 receives the control data and provides the control data to the look-up table 206. In response, the look-up table 206 provides the road surface type corresponding to the control data and the filter coefficients.

Figure 3:
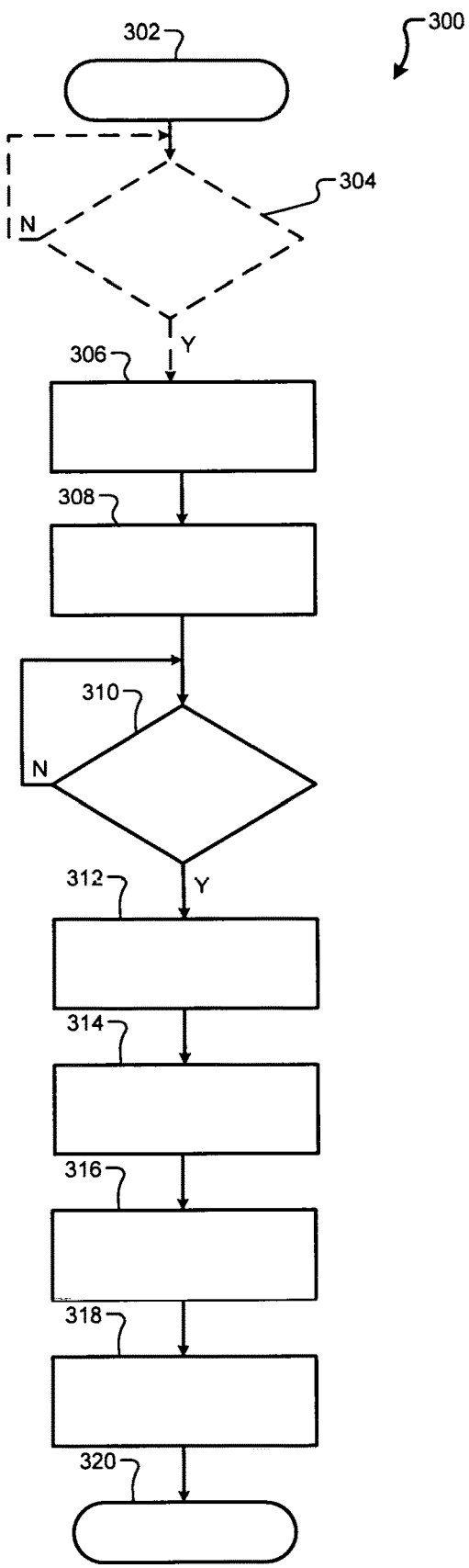
FIG. 3 is a flow diagram illustrating an example method for determining a road surface profile according to an example implementation of the present disclosure.

FIG. 3 illustrates an example method 300 for creating a road surface profile based upon filter coefficients generated by an active noise cancellation system. The method 300 is described in the context of the modules included in the example implementation of the road surface determination module 118 shown in FIG. 2. However, the particular modules that perform the steps of the method may be different than those mentioned below and/or the method may be implemented apart from the modules of FIG. 2.

The method 300 begins at 302. At 304, in some implementations, a determination is made of whether the selectable vehicle operating mode is received. If the selectable vehicle operating mode is not received, the method 300 returns to 304. If the selectable vehicle operating mode is received, the road surface profile module 204 receives a signal to start a time counter from the data input interface 210 at 306. At 308, the filter coefficient monitoring module 202 receives filter coefficient data from the noise cancellation module 116. At 310, the road surface profile module 204 determines whether a signal to terminate the time counter has been received. If no signal to terminate the time counter has been received, the method 300 returns to 310.

If the signal to terminate has been received to define a time period, a road surface type is received from the data input interface 210 at 312. At 314, the road surface profile module 204 associates a road surface type with the set of filter coefficients measured over the time period. At 316, the road surface profile module 204 generates a road surface profile. At 318, the road surface profile and corresponding road surface type are stored in the look-up table 206. At 320, the method 300 ends.

Figure 4:
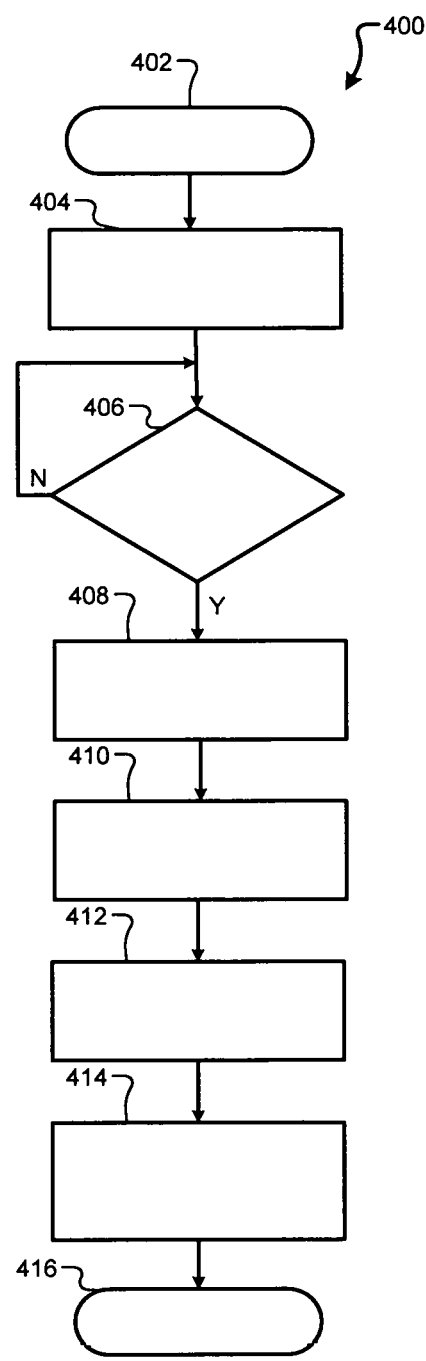
FIG. 4 is a flow diagram illustrating an example method for determining a road surface type according to an example implementation of the present disclosure.

FIG. 4 illustrates an example method 400 for determining a road surface type based upon filter coefficient data generated by the active noise cancellation system. The method 400 is described in the context of the modules included in the example implementation of the road surface determination module 118 shown in FIG. 2. However, the particular modules that perform the steps of the method may be different than those mentioned below and/or the method may be implemented apart from the modules of FIG. 2.

The method 400 begins at 402. At 404, the filter coefficient monitoring module 202 receives filter coefficient data from the noise cancellation module 116. At 406, the road surface determination module 208 determines whether the received filter coefficient data exceeds a predetermined filter coefficient data threshold. If the filter coefficient data does not exceed the predetermined filter coefficient data threshold, the method 400 returns to 406. If the filter coefficient data exceeds the predetermined filter coefficient data threshold, the road surface determination module 208 accesses the look-up table 206 at 408. At 410, the road surface determination module 208 provides the received filter coefficient data to the look-up table 206. In some implementations, the road surface determination module 208 also provides control data to the look-up table 206, which can be used with the filter coefficient data to select the road surface type.

At 412, the road surface determination module 208 receives the road surface type corresponding to the provided filter coefficient data from the look-up table 206. In the implementations that include providing the control data to the look-up table 206, the look-up table 206 provides the road surface type based upon the control data and the filter coefficient data. The road surface determination module 208 provides the road surface type to the vehicle communication bus 121 and/or control module(s) 120 at 414. The method 400 ends at 416.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A road profile detection system for a vehicle, comprising:
a noise cancellation module including a plurality of taps with a plurality of filter coefficients, respectively and configured to adjust values of the plurality of filter coefficients during operation of the vehicle;
a filter coefficient monitoring module configured to sample the plurality of filter coefficients from the noise cancellation module; and
a road surface determination module configured to receive the plurality of filter coefficients and to determine a road surface type based on the plurality of filter coefficients.

2. The road profile detection system as recited in claim 1, wherein the road surface determination module is further configured to:
compare the plurality of filter coefficients to filter coefficients of a plurality of stored entries; and
in response to the plurality of filter coefficients corresponding to one of the plurality of stored entries, select a road surface type corresponding to the one of the plurality of stored entries.

3. The road profile detection system as recited in claim 2, further comprising a look-up table including the plurality of stored entries.

4. The road profile detection system as recited in claim 1, further comprising a control module configured to modify an operating parameter of a vehicle based upon the road surface type as determined by the road surface determination module.

5. The road profile detection system as recited in claim 4, wherein the operating parameter comprises at least one of applying a brake, adjusting a body mount, and adjusting an active filter associated with the noise cancellation module.

6. The road profile detection system as recited in claim 1, wherein the noise cancellation module is further configured to adjust values of the plurality of filter coefficients during operation of the vehicle based on outputs of at least one vibration sensor of the vehicle and at least one microphone in the vehicle.

7. A system, comprising:
a filter coefficient monitoring module that is configured to receive a first set of filter coefficient data from a noise cancellation module;
a road surface profile module that is configured to:
receive an input representing a road surface type and generate a road surface profile based upon the road surface type and the first set of filter coefficient data;
store the road surface profile including a correspondence between the road surface type and the first set of filter coefficient data; and
perform a matrix calculation on the first set of filter coefficient data to represent the road surface profile; and
a road surface determination module that is configured to:
receive a second set of filter coefficient data and determine the road surface type based upon the second set of filter coefficient data, the second set of filter coefficient data different from the first set of filter coefficient data; and
access a look-up table, provide the second set of filter coefficient data to the look-up table, and receive the road surface type from the look-up table.

8. A method, comprising:
receiving a second set of filter coefficient data;
retrieving a road surface profile based upon the second set of filter coefficient data, the road surface profile including a road surface type that corresponds to a first set of filter coefficient data;
determining the road surface type based upon the second set of filter coefficient data, the second set of filter coefficient data different from the first set of filter coefficient data;
accessing a look-up table, providing the second set of filter coefficient data to the look-up table, and receiving the road surface type from the look-up table; and
performing a matrix calculation on the first set of filter coefficient data to represent the road surface profile.

9. A method for detecting a road profile in a vehicle, comprising:
performing noise cancellation using a plurality of taps with a plurality of filter coefficients, respectively;
adjusting values of the plurality of filter coefficients during operation of the vehicle; and
determining a road surface type based on the plurality of filter coefficients.

10. The method as recited in claim 9, wherein determining the road surface type includes:
comparing the plurality of filter coefficients to filter coefficients of a plurality of stored entries;
determining that the plurality of filter coefficients corresponds to one of the plurality of stored entries; and
selecting a road surface type corresponding to the one of the plurality of stored entries.

11. The method as recited in claim 9, further comprising modifying an operating parameter of a vehicle based upon the road surface type.

12. The method as recited in claim 11, wherein the operating parameter at least one of controls a brake, controls a body mount, and adjusts an active filter associated with noise cancellation.

13. The method as recited in claim 9, further comprising adjusting values of the plurality of filter coefficients during operation of the vehicle based on outputs of at least one vibration sensor of the vehicle and at least one microphone in the vehicle.

\* \* \* \* \*